(12) United States Patent
Beser (10) Patent No.: US 8,233,521 B1
(45) Date of Patent: Jul. 31, 2012

(54) FLEXIBLE UPSTREAM RESOURCE SHARING IN CABLE MODEM SYSTEMS

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 387 days.

(21) Appl. No.: 12/550,983

(22) Filed: Aug. 31, 2009

Related U.S. Application Data (63) Continuation of application No. 12/368,441, filed on Feb. 10, 2009, now Pat. No. 7,599,429, which is a continuation of application No. 12/133,785, filed on Jun. 5, 2008, now Pat. No. 7,512,176, which is a continuation of application No. 10/355,243, filed on Jan. 31, 2003, now Pat. No. 7,397,846.

(60) Provisional application No. 60/415,529, filed on Oct. 3, 2002.

(51) Int. Cl.
*H04L 5/16* (2006.01)

(52) U.S. Cl. ............................................. 375/222

(58) Field of Classification Search ............... 375/222, 375/219; 370/276; 379/90.01
See application file for complete search history.

(56) References Cited

U.S. PATENT DOCUMENTS

| | | | |
|---|---|---|---|
| 4,625,308 A | 11/1986 | Kim et al. | |
| 4,816,825 A | 3/1989 | Chan et al. | |
| 5,054,034 A | 10/1991 | Hughes-Hartogs | |
| 6,178,330 B1 | 1/2001 | Alberty et al. | |
| 6,195,359 B1 | 2/2001 | Eng et al. | |
| 6,542,460 B1 | 4/2003 | Ring | |
| 6,597,681 B1 | 7/2003 | Conner | |
| 6,687,260 B1 | 2/2004 | Peace | |
| 6,697,440 B1 | 2/2004 | Shiraishi et al. | |
| 6,742,187 B1 | 5/2004 | Vogel | |
| 6,791,995 B1 | 9/2004 | Azenkot et al. | |
| 6,816,500 B1 | 11/2004 | Mannette et al. | |
| 6,839,429 B1 | 1/2005 | Gaikwad et al. | |
| 7,068,597 B1 | 6/2006 | Fijolek et al. | |
| 7,072,360 B2 * | 7/2006 | Dravida et al. | 370/468 |
| 7,085,287 B1 | 8/2006 | Chapman | |
| 7,085,306 B1 | 8/2006 | Voldman et al. | |
| 7,113,484 B1 * | 9/2006 | Chapman et al. | 370/252 |
| 7,167,511 B1 | 1/2007 | Goren et al. | |
| 7,397,846 B1 | 7/2008 | Beser | |
| 7,512,176 B1 | 3/2009 | Beser | |
| 2002/0181633 A1 | 12/2002 | Trans | |
| 2003/0081588 A1 | 5/2003 | Simbirski et al. | |
| 2003/0202492 A1 | 10/2003 | Akella et al. | |

(Continued)

OTHER PUBLICATIONS

Co-pending U.S. Appl. No. 12/368,441, filed Feb. 10, 2009; Nurettin Burcak Beser, entitled "Flexible Upstream Resource Sharing in Cable Modem Systems".

(Continued)

*Primary Examiner* — Khai Tran
(74) *Attorney, Agent, or Firm* — Harrity & Harrity, LLP (57) ABSTRACT

A cable modem termination system may include a number of receivers and a number of input ports configured to receive bursts of data from a number of cable modems on a number of channels. At least one receiver of the number of receivers may be configured to receive and decode bursts of data on at least one channel according to a first control signal. An input selector may be connected between the number of input ports and the number of receivers. The input selector may be configured to route bursts of data from the number of input ports to the number of receivers according to a second control signal.

19 Claims, 7 Drawing Sheets

U.S. PATENT DOCUMENTS

2003/0208775 A1 11/2003 Roberts et al.
2004/0218589 A1 11/2004 Hebsgaard et al.
2006/0120282 A1 6/2006 Carlson et al.
2006/0182148 A1 8/2006 Hebsgaard et al.

OTHER PUBLICATIONS

Beser, "Active Load Balancing and Its Effects on Traffic Engineering," SCTE-ET 2002, San Jose, California, Jan. 2002, pp. 1-10.

* cited by examiner

FLEXIBLE UPSTREAM RESOURCE SHARING IN CABLE MODEM SYSTEMS

CROSS REFERENCE TO RELATED APPLICATIONS

This application is a continuation of prior co-pending U.S. patent application Ser. No. 12/368,441, filed Feb. 10, 2009, entitled "Flexible Upstream Resource Sharing in Cable Modem Systems", which is a continuation of prior co-pending U.S. patent application Ser. No. 12/133,785, filed Jun. 5, 2008, entitled "Flexible Upstream Resource Sharing in Cable Modem Systems", now U.S. Pat. No. 7,512,176, issued Mar. 31, 2009, which is a continuation of prior co-pending U.S. patent application Ser. No. 10/355,243, filed Jan. 31, 2003, entitled "Flexible Upstream Resource Sharing in Cable Modem Systems", now U.S. Pat. No. 7,397,846, issued Jun. 8, 2008, which claims priority from U.S. Provisional Patent Application No. 60/415,529, filed Oct. 3, 2002, entitled "Flexible Upstream Resource Sharing in Cable Modem Systems", the disclosures of which are incorporated herein by reference in their entirety.

BACKGROUND OF THE INVENTION

1. Field of the Invention

The present invention relates generally to network data transmission and, more particularly, to data transmission through cable modem systems.

2. Description of Related Art

In cable modem systems, a cable modem termination system (CMTS) at one end of a cable network typically services multiple cable modems (CMs) connected to the cable network. CMs are generally installed locally at the end-user's location, and communicate with the CMTS, which may be installed at a cable company's facility. The CMTS transmits data and messages to the CMs in a "downstream" direction and receives data bursts from the CMs in an "upstream" direction.

Data over Cable Service Interface Specification (DOCSIS) is a commonly used CM protocol that defines interface requirements for CMs. DOCSIS 2.0, for example, builds upon the capabilities of DOCSIS 1.0 and DOCSIS 1.1 and adds throughput in the upstream portion of the cable system. This increased upstream data capacity enables symmetrical and time-critical services such as videoconferencing and peer-to-peer applications. When sharing a communication channel with a CMTS, the CMs may use modulation schemes in which the modems transmit data bursts to the CMTS during designated time intervals. DOCSIS 2.0, for example, includes two modulation techniques: S-CDMA (synchronous code division multiple access) and A-TDMA (advanced frequency agile time division multiple access).

CMTSs typically receive data though a number of physical ports and further distinguish between different frequencies or "channels" of data using a number of internal receivers. Current CMTSs typically have a fixed relationship between their internal receiver(s) and the physical port(s). Such a static relationship between receivers and physical ports in a CMTS may cause data congestion or CM configuration restraints when, for example, the load on the ports changes dynamically, or when multiple modulation techniques (e.g., S-CDMA and A-TDMA) are used.

Therefore, there exists a need to more efficiently utilize CMTS capacity in cable modem systems.

SUMMARY OF THE INVENTION

Systems consistent with the principles of the invention address this and other needs by using the same receiver for at least two different cable modems on two different channels or physical input ports. The routing/mapping of channels and/or input ports to receivers may be dynamically changed on a per-burst basis.

In accordance with one aspect of the invention as embodied and broadly described herein, a method of dynamically allocating resources in a cable modem system may include receiving bursts of data from a number of cable modems at a number of input ports on a number of channels. The received bursts may be directed to a number of receivers. Directing the received bursts may include changing mappings of the number of channels to the number of receivers over time.

In another implementation consistent with principles of the invention, an apparatus for dynamically allocating resources in a cable modem system may include a number of input ports for receiving bursts of data from a number of cable modems on a number of channels. Selection logic may be configured to direct the received bursts to a plurality of receivers by changing mappings of the plurality of input ports to the plurality of receivers over time.

In a further implementation consistent with principles of the invention, a method of dynamically balancing a load from a number of registered cable modems in a cable modem system may include determining an amount of a total capacity of a first channel that is being used by active cable modems associated with the first channel. One or more other cable modems may be selectively moved to a second channel based on the determining.

In still another implementation consistent with principles of the invention, a cable modem termination system may include a number of input ports configured to receive bursts of data from a number of cable modems on a number of channels and a number of receivers. At least one receiver of the number of receivers may be configured to receive and decode bursts of data on at least one channel according to a first control signal. An input selector may be connected between the number of input ports and the number of receivers. The input selector may be configured to route bursts of data from the number of input ports to the number of receivers according to a second control signal.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Systems and methods consistent with the principles of the invention may implement dynamic routing of channels or input ports to receivers in a CMTS by changing the multiplexing and decoding as often as once per burst of data.

System Overview

Figure 1:
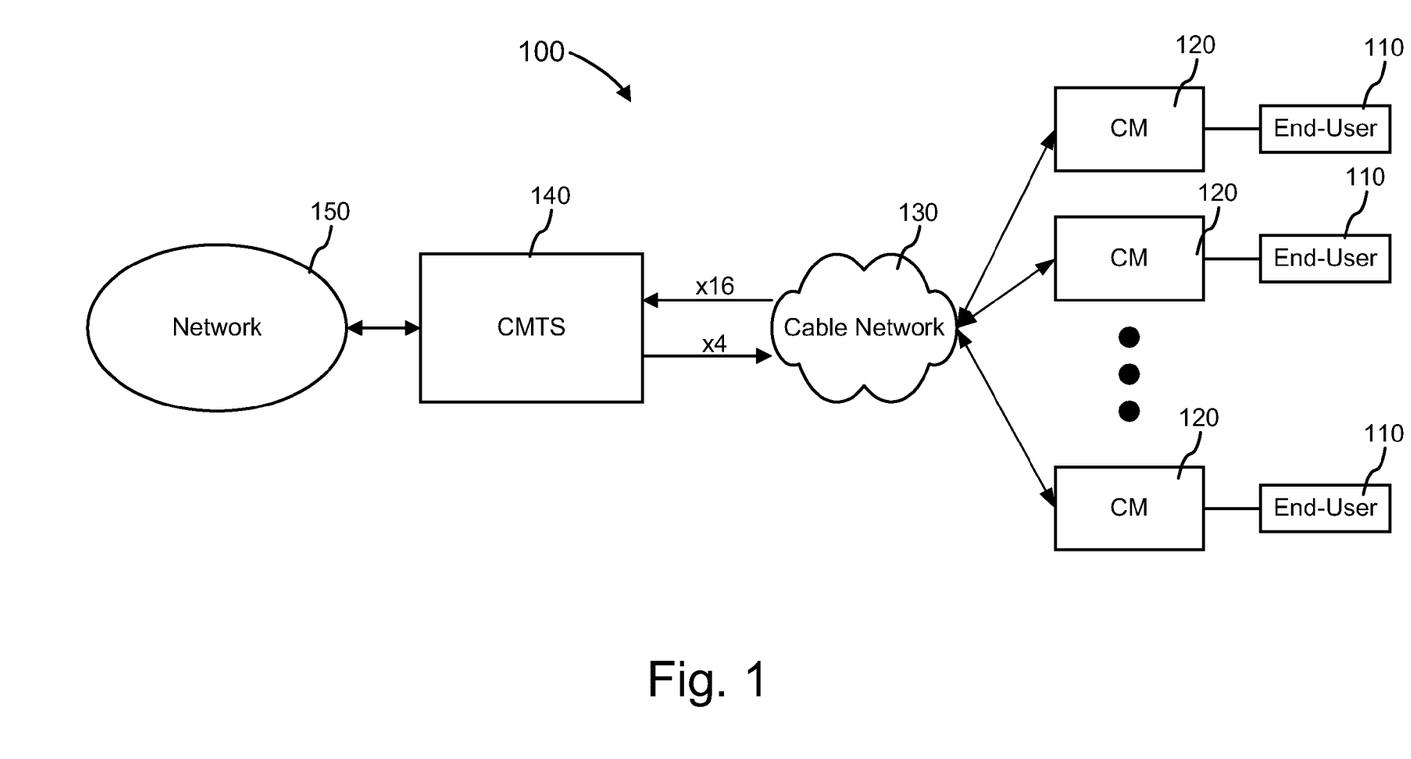
FIG. 1 is a diagram illustrating an exemplary system in which concepts consistent with aspects of the invention may be implemented.

FIG. 1 is a diagram illustrating an exemplary system 100 in which concepts consistent with aspects of the invention may be implemented. System 100 may include a number of end users 110, a number of cable modems (CMs) 120, a cable network 130, a cable modem termination system (CMTS) 140, and a network 150.

End-users 110 may connect to the cable network 130 through CMs 120. CMs 120 typically are installed local to end-users 110. End-users 110 may include a device or a network (e.g., LAN) of devices that may include a television, a computer, a telephone, or any other type of equipment that can receive and/or send data via cable network 130. A LAN at an end-user 110 may include one or more of a wired network and a wireless network served by, for example, a switch, router, or a computer's network interface.

Cable network 130 may include a coaxial or hybrid optical fiber/coaxial (HFC) cable network. Cable modems 120 may interconnect with the cable network 130 via coaxial cable/optical fiber.

CMTS 140 may facilitate communications between cable modems 120 and network 150. CMTS 140 may be maintained by a cable company at a facility in relative proximity to end-users 110. CMTS 140 may include a number of upstream (i.e., from the cable modem to the CMTS) channels and downstream (i.e., from the CMTS to the cable modem) channels. For example, the group of cable modems 120 may be served by 16 upstream channels and four downstream channels. The downstream channels may be higher bandwidth channels than the upstream channels. Cable modems 120 transmit data units, called bursts, to CMTS 140 during pre-assigned time slots.

Network 150 may include one or more networks of any type, including a Public Land Mobile Network (PLMN), Public Switched Telephone Network (PSTN), local area network (LAN), metropolitan area network (MAN), wide area network (WAN), the Internet, or an intranet.

It will be appreciated that the number of components illustrated in FIG. 1 is provided for explanatory purposes only. A typical network may include more or fewer components than are illustrated in FIG. 1.

Exemplary Downstream/Upstream Communication

Figure 2:
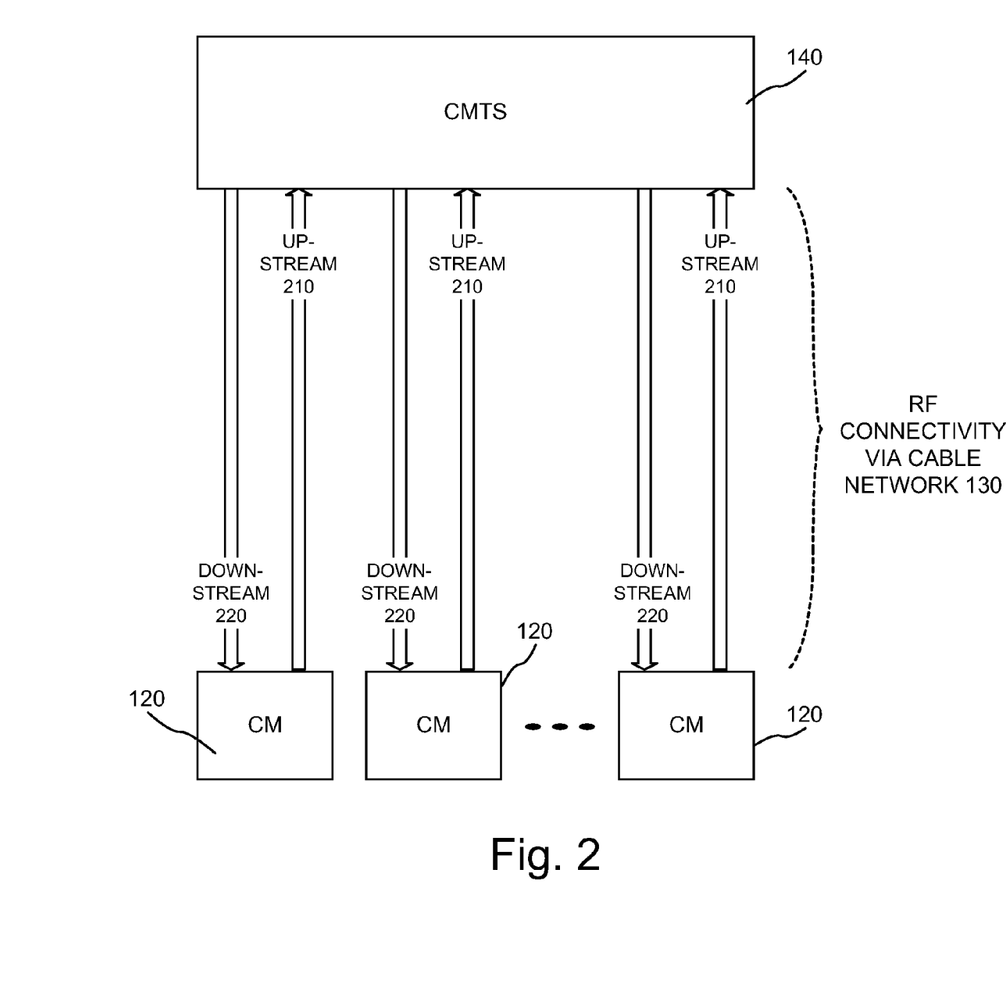
FIG. 2 is a diagram of exemplary upstream/downstream communications between a CMTS and multiple cable modems in the system of FIG. 1 according to an implementation consistent with the principles of invention.

FIG. 2 illustrates exemplary upstream and downstream communication between a CMTS 140 and multiple CMs 120 according to an implementation consistent with the principles of the invention. As illustrated in FIG. 2, CMTS 140 and CMs 120 interconnect via upstream 210 and downstream 220 RF channels of cable network 130, and may be implemented on a common physical communication channel, such as hybrid fiber/coax (HFC). Each upstream channel 210 and downstream channel 220 may communicate via a different frequency. Each upstream channel 210 may further include multiple "virtual" channels. Each virtual upstream channel may include a multiplexed timeslot of the upstream channel frequency. Each virtual upstream channel may further be associated with different transmission characteristics of cable modems 120. Such different transmission characteristics may include a different channel profile, such as different TDM timeslot size, symbol rate, frequency, preamble pattern, and/or burst profile. The different burst profile may include a different modulation, pre-amble length, data block size (e.g., Reed-Solomon block size), error correction (e.g., Reed-Solomon error correction), scrambling or encryption, encoding (e.g., differential encoding), maximum burst size, and/or guard time size.

Upstream channels 210 from cable modems 120 may, thus, include frequency bandwidth divided into multiple channels, with each channel possibly further time division multiplexed into multiple virtual upstream channels. CMTS 140 may transmit messages and data to each CM 120 on a downstream channel 220 and may receive transmissions from each cable modem 120 via an upstream channel 210. CMTS 140 may monitor a quality of the transmissions from each CM 120 on the upstream channels. Based on this monitoring, CMTS 140 may change its configuration to receive different combinations of channels from its input ports. For example, CMTS 140 may use "flexible upstreams" (FUS) to use a single receiver for two or more CMs on different channels or cable segments. This upstream flexibility of CMTS 140 will be further explained with respect to FIG. 3.

Exemplary Cable Modem Termination System

Figure 3:
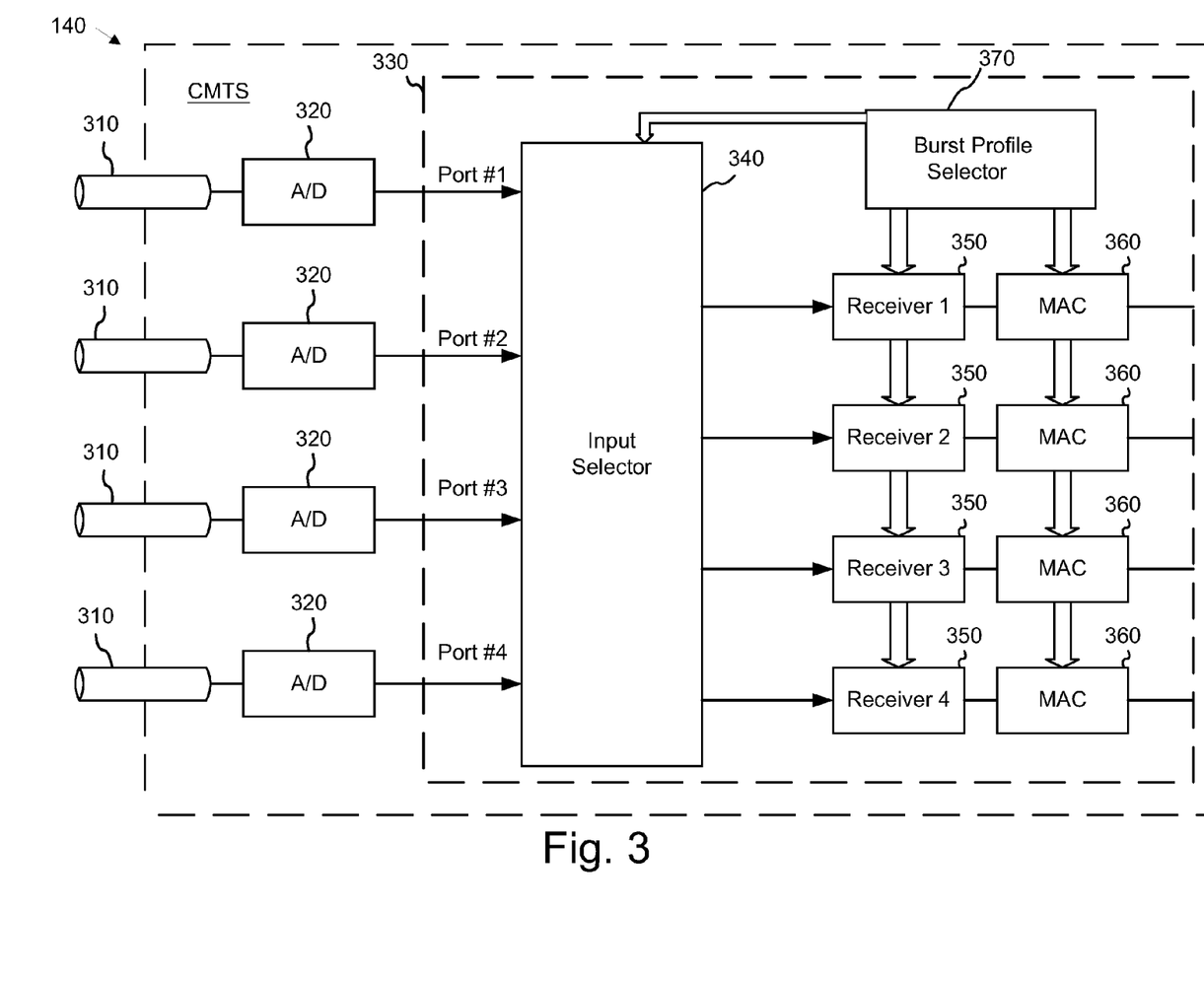
FIG. 3 is a diagram of an exemplary CMTS according to an implementation consistent with the principles of invention.

FIG. 3 is a diagram of an exemplary CMTS 140 according to an implementation consistent with the principles of invention. For ease of explanation, only certain portions of CMTS 140 involved in upstream data reception are illustrated. Other portions involved with, for example, scheduling and defining burst profiles, and conducting downstream communication, are present but not shown, as will be understood by those skilled in the cable modem system art.

CMTS 140 may include a number of physical input ports 310, a number of analog-to-digital (A/D) converters 320, and an upstream processor 330. In one implementation, the number of physical ports 310 and the number of corresponding A/D converters 320 may equal four, although fewer or more input ports 310 and A/D converters 320 may be used. A/D converters 320 may be configured to convert the analog upstream signals at ports 310 into digital representations of these upstream signals.

Upstream processor 330 may include an input selector 340, a number of receivers 350, a number of medium access control (MAC) units 360, and a burst profile selector 370. Upstream processor 330 may be implemented in, for example, an application-specific integrated circuit (ASIC) that is configured to perform the functions described below.

Input selector 340 may be configured to receive a number of digital upstream signals from A/D converters 320, and to pass various different channels/frequencies within these upstream signals to receivers 350. These channels/frequencies may be multiplexed (e.g., by (e.g., S-CDMA, A-TDMA, or a similar multiplexing scheme) within a time-series of upstream data. In one implementation consistent with the principles of the invention, input selector 340 may have a number of inputs corresponding to the number of input ports 310 (e.g., four). Input selector 340 may be conceptualized as a 4 port digital switch, in which any channel on one of the selector's inputs may be sent to any or all of the selector's outputs.

Channels of data present in the digital upstream signals output by A/D converters 320 are not necessarily always routed to the same combination of receivers 350. To the contrary, input selector 340 may be configured to dynamically send any channel on a particular input port to any number of the receivers 350. For example, for a particular burst of data, each one of physical ports 310 may receive from zero to 16 separate channels of data from CMs 120. Each channel may have an associated bandwidth that may become fully used when data from a number of operating devices (e.g., IP-based telephones) from end-users 110 increases beyond a threshold. On a per-burst basis, however, input selector 340 may route a channel on a particular port 310 to different combinations of receivers 350. This ability to dynamically change which channels of data are processed by which receivers 350 permits the rapid shifting of end-user devices to different channels that have available bandwidth. Such dynamic capability also allows receivers 350 to collectively support a given modulation technique (e.g., S-CDMA) without each of receivers 350 being able to support the technique.

Receivers 350 may be configured to receive one or more channels of data (e.g., at different modulation frequencies) and convert the data in each channel into a format suitable for further processing by MAC units 360. In one implementation consistent with the principles of the invention, receivers 350 may each receive and convert up to 16 total channels of data, with each individual receiver 350 capable of handling 0 to 16 of the total number of channels. For example, the four receivers 350 shown in FIG. 3 may each receive and convert up to four channels of data. Alternately, two of the receivers 350 may each receive and convert up to six channels of data, and two of the receivers 350 may each receive and convert up to two channels of data. Other permutations are possible, and will be apparent to those skilled in the art. Conceptually, receivers 350 may be thought of as 16 different receivers, each of which may receive a channel of data from one of input ports 310. Note that all receivers 350 may receive and process, for example, the same channel from the same input port 310, if desired.

MAC units 360 may perform low-layer processing on demodulated data from receivers 350, as will be appreciated by those skilled in the art.

Burst profile selector 370 may be configured to control input selector 340, receivers 350, and MAC units 360 based on inputs that it receives from another processing unit (not shown) within CMTS 140. The other processing unit (which may include software) in CMTS 140 may receive upstream requests from CMs 120, grant the requests, and transmit burst times and channel information (i.e., which channels to use for the data bursts) (collectively "burst profiles") downstream to CMs 120, as is known in the art. In addition to sending burst profiles to CMs 120, the other processing unit may send burst profile selector 370 an "information element" (IE) message that corresponds to the sent burst profiles.

Using this IE message, burst profile selector 370 may, for each burst (i.e., dynamically), direct input selector 340 to send particular channels from particular ports 310 to certain receivers 350. Burst profile selector 370 may also instruct receivers 350 and MAC units 360 to process these channels on a per-burst basis. This information from burst profile selector 370 may be altered, if desired, for each burst received from the CMs.

Exemplary Information Element Message

Figure 4:
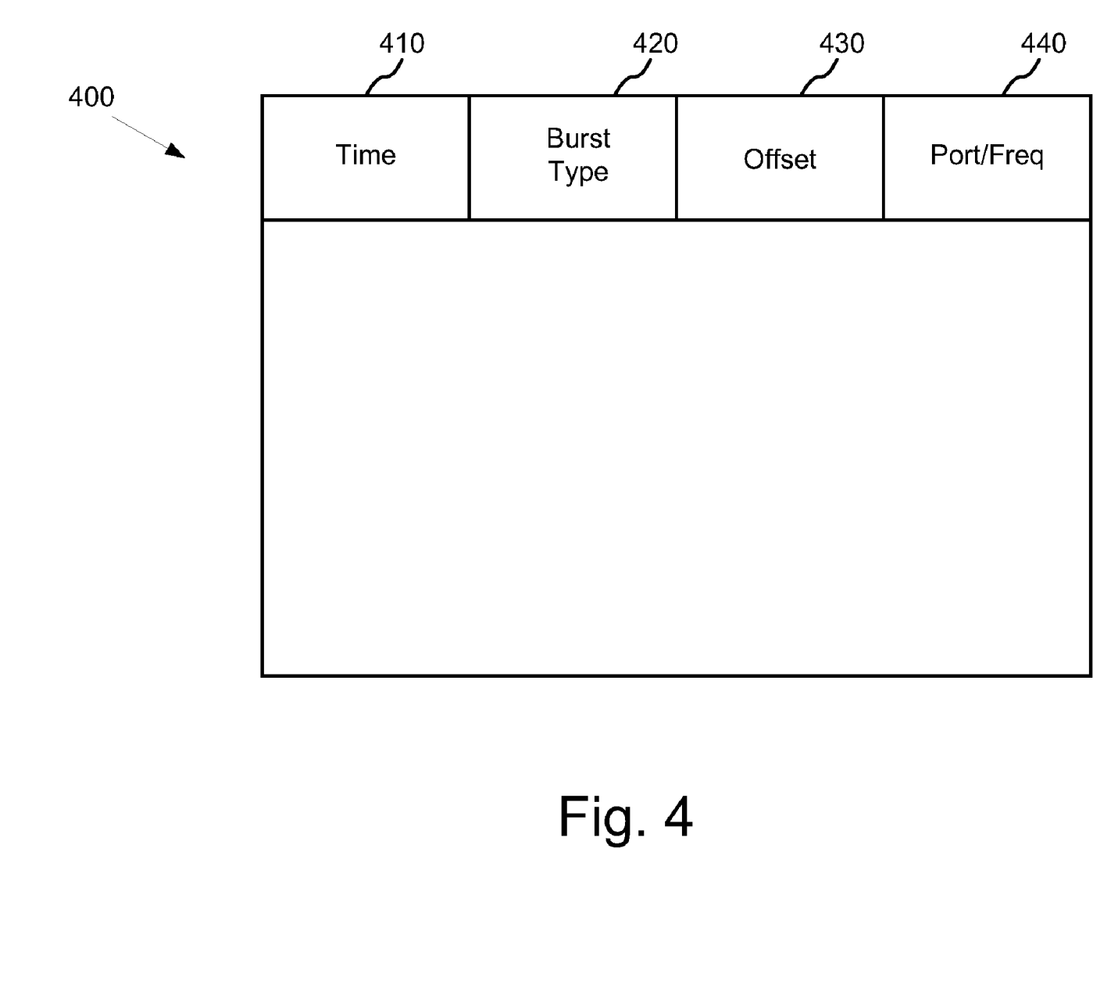
FIG. 4 is a diagram of an exemplary information element message according to an implementation consistent with the principles of the invention.

FIG. 4 is a diagram of an exemplary IE message 400 according to an implementation consistent with the principles of the invention. IE message 400 may include for each data burst a time field 410, a burst type field 420, an offset field 430, and a port/frequency field 440. Although not shown, IE message 400 may contain a number of sets of fields 410-440, one set for each expected burst. For ease of explanation, only one set of fields 410-440 corresponding to a single burst is shown.

Time field 410 may indicate when a particular burst will arrive at CMTS 140. Burst type field 420 may indicate a type of burst that will arrive at time 410. Offset field 430 may indicate the duration of the burst.

Port/frequency field 440 provides a destination within CMTS 140 for the burst of data. Using field 440, burst profile selector 370 may instruct input selector 340 to send the burst to a particular receiver 350 (e.g., receiver 2). Similarly, using field 440, burst profile selector 370 may instruct a particular one of receivers 350 to use a certain frequency for demodulation (i.e., to decode a given channel).

Port/frequency field 440 within IE 400 is the mechanism by which CMTS 140 dynamically routes channels from certain input ports 310 to certain receivers 350 for conversion into binary data. Because fields 410-440 are referenced to a particular burst, channels may be re-routed through CMTS 140 for each burst as it arrives. Such dynamic channel/bandwidth allocation may not, in practice, be needed for every burst. Dynamic routing within CMTS 140 does have advantages, however, as will be illustrated below.

Exemplary Flexible Upstream Processing

Figure 5:
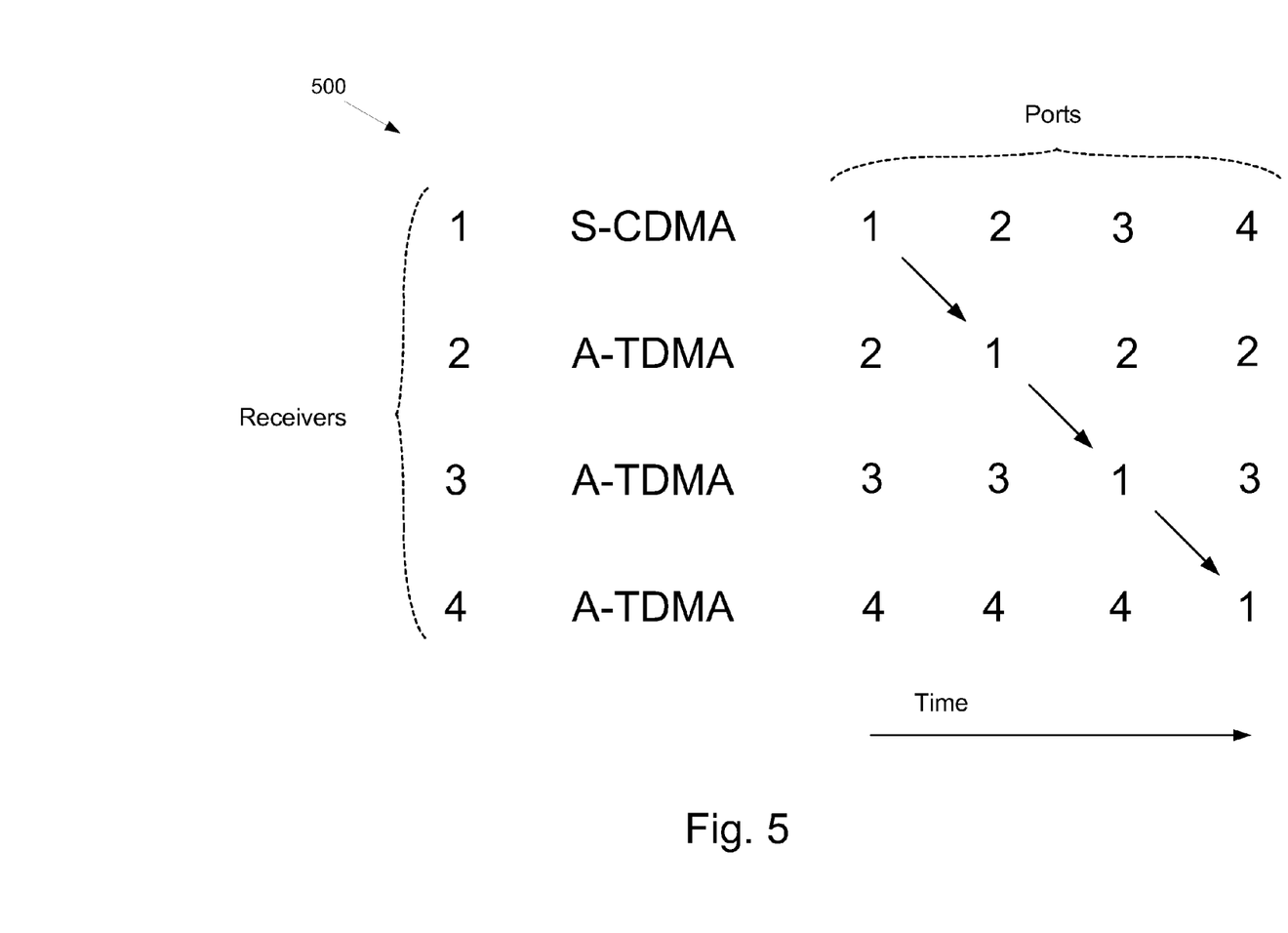
FIG. 5 illustrates an exemplary diagram illustrating dynamically mapping input ports to receivers in a manner consistent with the principles of the invention.

FIG. 5 illustrates an exemplary diagram illustrating dynamically mapping input ports 310 to receivers 350 in a manner consistent with the principles of the invention. FIG. 5 further illustrates that, for example, only one of receivers 350 may support a less prevalent modulation scheme (e.g., S-CDMA). Under control of burst profile selector 370, input selector 340 may successively connect ports 1-4 to a first of receivers 350 that supports S-CDMA. Although in FIG. 5, each port 1-4 is shown connected 25% of the time to receiver 1, ports 1-4 need not all be connected to receiver 1. Nor do the percentages need to be equal. For example, port 1 may be connected to receiver 1 90% of the time, and port 2 may be connected to receiver 1 10% of the time.

It should be noted that FIG. 5 illustrates a "statistical multiplexing" technique, where a channel (or channels) is routed to one of receivers 350 for a predetermined portion of time (e.g., 5% or 10%). As will be appreciated by those skilled in the art, statistical multiplexing (i.e., sharing a system resource among multiple users) may allow efficient utilization of channel bandwidth, while minimizing blocking probabilities. Further, such techniques allow CMTS 140 to be more efficiently designed, and CMs 120 to be deployed with fewer restrictions. For example, not all receivers 350 need support a particular modulation protocol (e.g., S-CDMA), when bursts from CMs 120 using this protocol may be statistically routed to one of receivers 350 that does support the protocol. In one implementation consistent with the principles of the invention, only one of receivers 350 supports S-CDMA, and the remainder of receivers 350 support A-TDMA instead.

Another advantage of dynamically mapping ports 310 to receivers 350 occurs when a particular channel's bandwidth becomes fully used. In such an instance, a number of devices configured to use that channel may be dynamically allocated to an alternate channel having available bandwidth. If the alternate channel is associated with a different physical port 310 than the "full" channel, both channels may still be dynamically routed to the same one of receivers 350 if desired. Such a scenario may be termed "bandwidth sharing," and it may be performed dynamically using any additional channel that has available bandwidth.

In other words, CMTS 140 may determine, either from requests from CMs 120 or by some other measure, that a particular channel is becoming fully utilized. In one implementation consistent with the principles of the invention, CMTS 140 may use a predetermined threshold (e.g., 90-95% bandwidth utilization) to trigger the bandwidth sharing and any associated mapping of signals to receivers 350. In another implementation consistent with the principles of the invention, the bandwidth sharing of a channel may occur for a fixed percentage of time, similar to the statistical multiplexing described above. Although the former scheme may occur on a per-burst basis (and perhaps use bandwidth resources more efficiently), the latter scheme may be, for example, computationally less expensive. That is, a fixed (or deterministically varying) percentage of channel sharing may have less overhead associated with it than generating a sharing decision for each burst of data.

Figure 6:
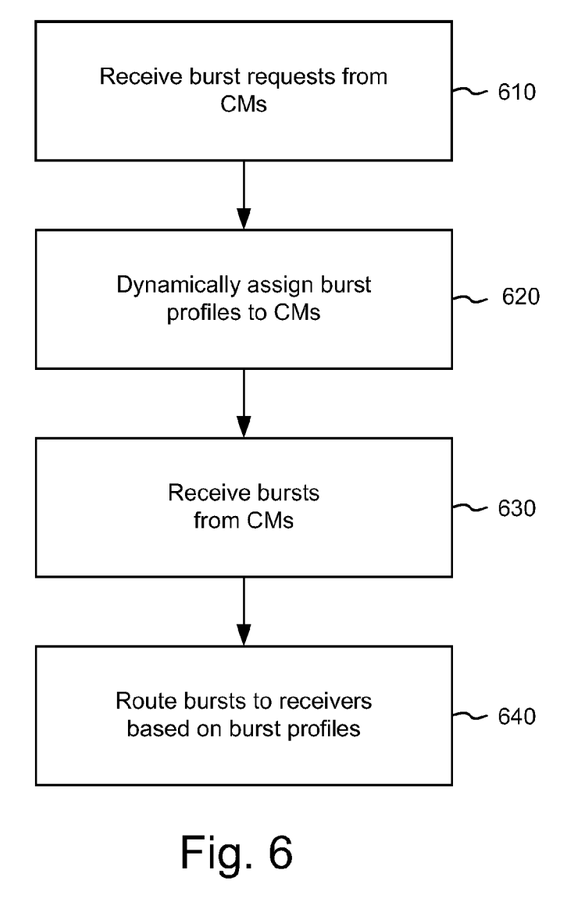
FIG. 6 illustrates an exemplary process for dynamically handling bursts of data in a manner consistent with the principles of the invention.

FIG. 6 illustrates an exemplary process for dynamically handling bursts of data in a manner consistent with the principles of the invention. As one skilled in the art will appreciate, the method exemplified by FIG. 6 can be implemented as a sequence of instructions and stored in a memory of CMTS 140 for execution by processing unit(s) therein, via hardware in CMTS 140 or a combination of hardware and software.

The exemplary process may begin with CMTS 140 receiving burst requests from CMs 120 [act 610]. CMTS 140 may grant the burst requests according to their timing and priority in accordance with schemes familiar to those skilled in the art. Processing may continue with CMTS 140 dynamically assigning and transmitting burst profiles to CMs 120 [act 620]. The burst profiles may specify, for example, the time slots and channels for CMs 120 to use when sending the data bursts to CMTS 140. Concurrently with sending the burst profiles to CMs 120, CMTS 140 may send, for example, a corresponding IE message 400 to burst profile selector 370.

Processing may continue when CMTS 140 receives the bursts from CMs 120 on its input ports 310 [act 630]. This receiving act 630 may occur after some time has passed, because CMs 120 need to receive the burst profiles, format their data bursts, and send the bursts at the appropriate time slot(s). Processing may continue when input selector 340 dynamically routes data bursts received by input ports 310 to receivers 350 [act 640]. In one implementation, input selector 340 may use IE messages 400 to accomplish this routing, and IE messages 400 may be concurrently generated with, and based on, the burst profiles sent to CMs 120. Those skilled in the art will appreciate that CMTS 140 may use various schemes to route channels/frequencies from input ports 310 to receivers 350, and may change or modify such schemes as often as once for every arriving burst of data. These schemes may be controlled by software in CMTS 140, and may be implemented by the burst profiles and the IE messages sent to CMs 120 and input selector 340, respectively.

Figure 7:
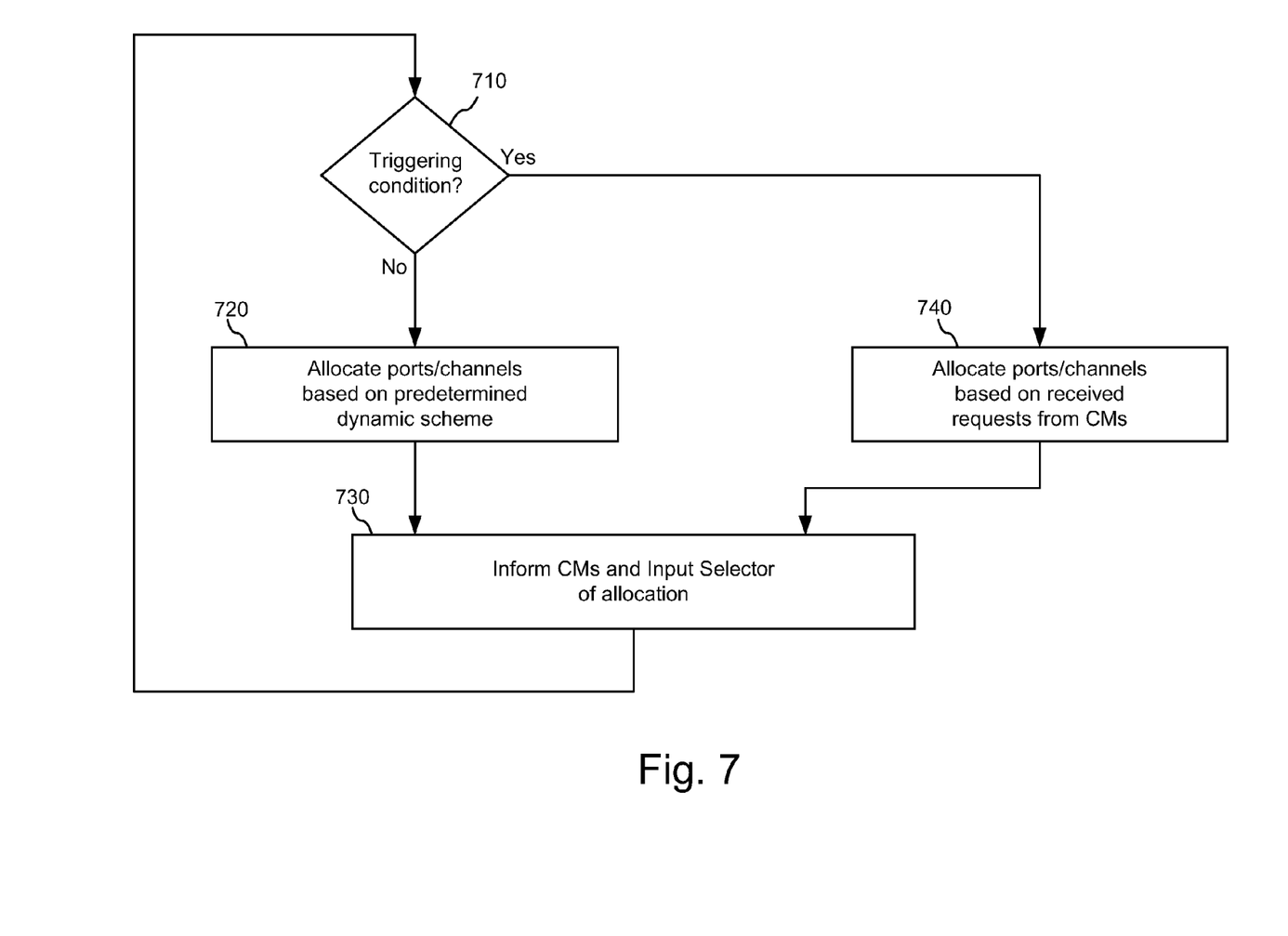
FIG. 7 illustrates an exemplary process for dynamically allocating channels in a CMTS in a manner consistent with the principles of the invention.

FIG. 7 illustrates an exemplary process for dynamically allocating channels in CMTS 140 in a manner consistent with the principles of the invention. As one skilled in the art will appreciate, the method exemplified by FIG. 7 can be implemented as a sequence of instructions and stored in a memory of CMTS 140 for execution by processing unit(s) therein, via hardware in CMTS 140 or a combination of hardware and software.

Processing may begin by CMTS 140 determining whether a triggering condition has been reached [act 710]. The triggering condition may include, for example, nearly full bandwidth of a channel or port 310. The presence of the triggering condition may determine whether CMTS 140 allocates channels to CMs 120 on a predetermined dynamic basis or on a per-burst basis as described in more detail below.

For example, if the triggering condition is not met, CMTS 140 may allocate ports and channels/frequencies based on a predetermined dynamic scheme [act 720]. Examples of such a scheme may include the scheme illustrated in FIG. 5, where a particular receiver 350 is shared among a number of different input ports 310. Another example of a predetermined dynamic scheme may include statistical multiplexing, for example, where a channel is allocated among a number of different input ports 310 for predetermined percentages (e.g., 1%, 5%, 25%, etc.) or amounts of time.

CMTS 140 may implement the selected port and channel allocation by sending burst profiles to CMs 120 and by sending corresponding IE messages 400 to burst profile selector 370 [act 730]. In this manner, CMs 120 determine which channel to use for a given burst of data, and burst profile selector 370 identifies how to route that burst upon arrival at CMTS 140.

If the triggering condition is met, CMTS 140 may allocate ports and channels/frequencies based on the received requests from CMs 120 or other network data [act 740]. Examples of such allocation of resources depending on network data (e.g., bandwidth capacity remaining) include active load balancing, preventative load balancing, reactive load balancing, and statistical multiplexing with load balancing, all of which are described in greater detail below.

"Active load balancing" refers to the ability to move registered CMs 120 (i.e., CMs that have already been initialized) among upstream and/or downstream channels. While other methods of load balancing exist, most of these methods use demand side measures such as RED (random early discard) in a short time frame or dropping service flows or CMs 120 in a medium time frame. Active load balancing may be reactive or preventative.

In "preventative load balancing," CMTS 140 moves CMs 120 that are generating no traffic to a channel that is not congested. This movement of "idle" CMs 120 may occur before congestion is detected on a given channel. For example, once a specific level of utilization is detected in a channel with preventative load balancing, CMTS 140 may move CMs 120 without active service flows to less utilized channels. This is done to prevent new traffic sources within moved CMs 120 from being turned on to the highly utilized channel.

For example, in a VoIP (voice over IP) network, each upstream channel may serve 50 CMs 120 with 100 voice lines, and each upstream channel may have a capacity of 20 voice connections. When 8 voice connections are in use in an upstream channel, CMTS 140 may begin to move 30 CMs 120 that have 45 voice lines that are not in use to other upstream channels. Therefore, the probability of new calls being made in the highly utilized channel is reduced by about 50%.

In "reactive load balancing," CMTS 140 decides whether to accept a new connection at the current upstream/downstream channels or to move the corresponding CM 120 to a different channel. The success of reactive load balancing may depend on CMTS 140's ability to predict the channel utilization (if the requested connection by the requesting CM 120 is admitted), as well as the ability of CMTS 140 and CM 120 to change channels without disturbing the application that requested the service flow.

Time-varying behavior and mean bandwidth requirement of traffic flows vary widely among different sources of IP traffic. It is difficult to characterize the bandwidth of a requested connection, even with well researched telephony traffic patterns and data. These usage patterns typically depend on location/date and change as time passes. This difficulty has led to methods to reserve the peak bandwidth of the connection (deterministic multiplexing), as required for constant bit rate (generally served by unsolicited grant scheduling) sources. However, it is possible to gain efficiency by taking advantage of the statistical nature of variable bit rate (non-UGS) sources, which has led to numerous "statistical multiplexing" schemes.

Statistical multiplexing schemes assign less than the peak bandwidth that may be required and sometimes introduce packet loss and/or delay. The extent to which these service degradations occur is measured by the quality of service (QOS) offered to the connection. A preventative load balancing scheme aims to balance the QOS offered to admitted connections with the network utilization by reducing the likelihood of new connections requested in the highly utilized channel. Many schemes decide whether or not to accept a connection based on knowledge of the traffic behavior, the service flows' quality requirements and the current state of the network.

When active load balancing is in use, the main impact of adding statistical multiplexing is that all of the available channels behave as if they are one unified channel with the aggregate bandwidth of every channel that is used in active load balancing. For example, in a cable connection that has four upstream channels, each upstream channel having a capacity of 2.56 Mbps, if active load balancing is not used, one of CMs 120 would have an upstream channel capacity of 2.56 Mbps. When active load balancing is used, available channel capacity would quadruple to 10.24 Mbps. By adding statistical multiplexing, even though the actual channel capacity does not increase, it is possible to add more services while maintaining the same blocking probability.

As one example, it is possible to use the above exemplary system primarily for voice, which has 96 Kbps upstream bit-rate. Without load balancing, for a blocking probability of 0.01, the number of voice lines that can be served by one channel is:

2.56 Mbps/96 Kbps=26 voice links=>17 Erlangs, where an Erlang is a measure of telephone use. The total number of voice lines that may be served by the upstream channels is:

4*17 Erlangs=67.8 Erlangs.

By contrast, with active load balancing and for the same blocking probability, the number of voice lines that can be served by the four channels is:

2.56 Mbps/96 Kbps*4=104 voice links=>87.8 Erlangs

The difference that active load balancing makes is 87.8−67.8=20 Erlangs. Hence, the use of active load balancing makes it possible to add approximately 30% more voice lines without even adding a new upstream channel. This increased usage through load balancing and statistical multiplexing is possible because although the number of available voice connections increases, the probability that all the links will be busy decreases by a greater percentage.

CONCLUSION

Consistent with the principles of the present invention, processes may be implemented that use the same receiver for at least two different cable modems on two different channels or physical input ports. The routing/mapping of channels and/or input ports to receivers may be dynamically changed as on a per-burst basis.

The foregoing description of embodiments of the present invention provides illustration and description, but is not intended to be exhaustive or to limit the invention to the precise form disclosed. Modifications and variations are possible in light of the above teachings or may be acquired from practice of the invention.

For example, although the description used specific numbers of channels, input ports, and receivers, these numbers are purely exemplary. The numbers of channels, input ports, and receivers in CMTS 140 may be less than or greater than the specific numbers described. While a series of acts has been described in FIGS. 6 and 7, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

The invention claimed is:

1. A method performed by a cable modem system, the method comprising:
    determining, by a processor of the cable modem system, that a particular condition is present with respect to a first burst request received at the cable modem system from a cable modem;
    routing, responsive to the first burst request, data received via a first input port of the cable modem system from the cable modem, to a first set of receivers, of a plurality of receivers of the cable modem system, based on a per-burst of data scheme;
    determining that the particular condition is not present with respect to a second burst request received at the cable modem system from the cable modem; and
    routing, responsive to the second request, data, received via the first input port from the cable modem, to a second set of receivers, of the plurality of receivers of the cable modem system, based on a predetermined dynamic scheme, wherein the first set of receivers differs from the second set of receivers.

2. The method of claim 1, wherein the particular condition relates to an available bandwidth a channel via which the data is received.

3. The method of claim 1, wherein the particular condition relates to an available bandwidth of the first input port.

4. The method of claim 1, wherein the predetermined dynamic scheme comprises sharing a particular receiver, of the plurality of receivers of the cable modem system, among at least the first input port and a second input port of a plurality of input ports of the cable modem system.

5. The method of claim 1, wherein the predetermined dynamic scheme comprises routing data, received via the first input port and at least a second input port, of a plurality of input ports of the cable modem system, for set amounts of time.

6. The method of claim 1, wherein the predetermined dynamic scheme comprises proportionately routing data, received via the first input port and at least a second input port, of a plurality of input ports of the cable modem system, based on a set of predetermined proportions.

7. The method of claim 1, wherein the per-burst of data scheme comprises routing the data based on network data determined by the cable modem system.

8. The method of claim 1, wherein the per-burst of data scheme comprises performing, with respect to a plurality of cable modems from which the cable modem system receives data, at least one of active load balancing, preventative load balancing, reactive load balancing, or statistical multiplexing with load balancing.

9. The method of claim 1, further comprising:
multiplexing data using a particular modulation protocol, wherein not all of the plurality of receivers are configured to support the particular modulation protocol.

10. A cable modem system comprising:
a plurality of ports through which a plurality of data bursts, comprising associated modulation protocols, are received from a plurality of cable modems, each of the data bursts being received via a plurality of channels;
a plurality of receivers, one or more of the plurality of receivers not supporting each of the associated modulation protocols; and
a selector to successively connect select ports, of the plurality of ports, to a first set of receivers, of the plurality of receivers, based on the associated modulation protocol of a first data burst received via a particular channel, of the plurality of channels, and an available bandwidth of the particular channel, relative to a bandwidth threshold determined for the particular channel.

11. The cable modem system of claim 10, wherein the selector is configured to successively connect the select ports to a second set of receivers, of the plurality of receivers, based on the associated modulation protocol of a second data burst received via the first channel, and a predetermined dynamic scheme, wherein the first set of receivers differs from the second set of receivers.

12. The cable modem system of claim 11, wherein, under the predetermined dynamic scheme, each of the select ports connects to a particular one of the first or second set of receivers for a predetermined amount of time.

13. The cable modem system of claim 11, wherein, under the predetermined dynamic scheme, connection to a particular one of the first or second set of receivers varies deterministically for each of the select ports.

14. The cable modem system of claim 10, wherein the selector is configured to successively connect the select ports to the first set of receivers by performing at least one of active load balancing, preventative load balancing, reactive load balancing, or statistical multiplexing with load balancing.

15. A cable modem system comprising:
a plurality of ports to receive a plurality of data bursts from a plurality of cable modems;
a converter to convert data of the plurality of data bursts into a plurality of digital signals;
a plurality of receivers to distinguish between a plurality of different frequencies present in the plurality of digital signal;
a first processor to determine whether a trigger condition has been met with respect to a particular frequency of the plurality of different frequencies; and
a second processor to connect a particular receiver, of the plurality of receivers, to a particular port, of the plurality of ports, based on a first receiver allocation scheme when the trigger condition is met or a second receiver allocation scheme when the trigger condition is not met.

16. The cable modem system of claim 15, wherein the first receiver allocation scheme comprises a per-data burst basis.

17. The cable modem system of claim 15, wherein the second receiver allocation scheme comprises successfully connecting another receiver, of the plurality of receivers, to the particular port based on a predetermined amount of connection time.

18. The cable modem system of claim 15, wherein the trigger condition comprises a predetermined threshold for bandwidth capacity associated with the particular frequency.

19. The cable modem system of claim 15, wherein the converter is configured to convert particular data, of a particular data burst, into a particular data signal, using a particular modulation protocol, and the second processor is configured to connect the particular receiver to the particular port based on the particular modulation protocol associated with particular data signal.

* * * * *